(12) United States Patent
Yonekubo et al.

(10) Patent No.: US 11,567,327 B2
(45) Date of Patent: Jan. 31, 2023

(54) DISPLAY MODULE AND DISPLAY DEVICE

(71) Applicant: SEIKO EPSON CORPORATION, Tokyo (JP)

(72) Inventors: Masatoshi Yonekubo, Hara-mura (JP); Takashi Takeda, Suwa (JP); Mitsutaka Ide, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 48 days.

(21) Appl. No.: 17/162,873

(22) Filed: Jan. 29, 2021

(65) Prior Publication Data

US 2021/0239990 A1 Aug. 5, 2021

(30) Foreign Application Priority Data

Jan. 31, 2020 (JP) .............................. JP2020-014623

(51) Int. Cl.
*G02B 27/01* (2006.01)
*G03H 1/02* (2006.01)

(52) U.S. Cl.
CPC .. *G02B 27/0172* (2013.01); *G02B 2027/0112* (2013.01); *G02B 2027/0174* (2013.01); *G02B 2027/0178* (2013.01); *G03H 1/0248* (2013.01)

(58) Field of Classification Search
None
See application file for complete search history.

(56) References Cited

U.S. PATENT DOCUMENTS

| | | | |
|---|---|---|---|
| 2018/0151194 A1* | 5/2018 | Noguchi | G11B 7/1372 |
| 2018/0231775 A1 | 8/2018 | Kawana | |
| 2019/0094546 A1 | 3/2019 | Ide | |
| 2019/0235266 A1 | 8/2019 | Ide et al. | |
| 2020/0209629 A1* | 7/2020 | Suzuki | G02B 17/0663 |
| 2021/0149209 A1 | 5/2021 | Ide et al. | |

FOREIGN PATENT DOCUMENTS

| | | |
|---|---|---|
| CN | 108445627 A | 8/2018 |
| CN | 207718077 U | 8/2018 |
| CN | 109557668 A | 4/2019 |
| CN | 110082926 A | 8/2019 |
| JP | 2019-133132 A | 8/2019 |

* cited by examiner

*Primary Examiner* — Nicholas J Lee
(74) *Attorney, Agent, or Firm* — Oliff PLC

(57) ABSTRACT

A display module includes an image light generation device configured to generate image light, a first reflection section configured to reflect the image light from the image light generation device, a first diffraction element configured to diffract the image light entering a first incident surface, a second reflection section configured to reflect the image light from the first diffraction element, and a second diffraction element configured to diffract the image light entering a second incident surface, thereby forming an exit pupil. When viewed from a normal line direction of a virtual plane including a normal line of the first incident surface and a normal line of the second incident surface, an optical axis of the image light from the image light generation device toward the first reflection section and an optical axis of the image light from the first diffraction element toward the second reflection section intersect each other.

9 Claims, 6 Drawing Sheets

DISPLAY MODULE AND DISPLAY DEVICE

The present application is based on, and claims priority from JP Application Serial Number 2020-014623, filed Jan. 31, 2020, the disclosure of which is hereby incorporated by reference herein in its entirety.

BACKGROUND

1. Technical Field

The present disclosure relates to a display module and a display device.

2. Related Art

A head-mounted display apparatus configured to guide image light to an eye of an observer while using a plurality of reflection surfaces to reflect the image light is known. JP-A-2019-133132 discloses a display apparatus of a head-mounted type including a first optical unit having positive power, a second optical unit including a first diffraction element and having positive power, a third optical unit having positive power, and a fourth optical unit including a second diffraction element and having positive power. In this display apparatus, a first intermediate image of image light is formed between the first optical unit and the third optical unit, a pupil is formed between the second optical unit and the fourth optical unit, a second intermediate image of the image light is formed between the third optical unit and the fourth optical unit, and an exit pupil is formed on a side of the fourth optical unit opposite to the third optical unit.

In the display apparatus of JP-A-2019-133132, each of the optical members is disposed so that a positional relationship between the optical members satisfies specific conditions, ensuring compensation for wavelength dispersion by the two diffraction elements. Therefore, numerous spaces for arranging the optical members are required, and the display apparatus may become large in size.

SUMMARY

In order to solve the problems described above, a display module according to one aspect of the present disclosure includes an image light generation device configured to generate image light, a first reflection section configured to reflect the image light emitted from the image light generation device, a first diffraction element including a first incident surface and configured to diffract and deflect the image light emitted from the first reflection section and entering through the first incident surface, a second reflection section configured to reflect the image light emitted from the first diffraction element, and a second diffraction element including a second incident surface and configured to diffract and deflect the image light emitted from the second reflection section and entering through the second incident surface, thereby forming an exit pupil. When viewed from a normal line direction of a virtual plane including a normal line of the first incident surface and a normal line of the second incident surface, an optical axis of the image light traveling from the image light generation device toward the first reflection section and an optical axis of the image light traveling from the first diffraction element toward the second reflection section intersect each other.

A display module according to another aspect of the present disclosure includes an image light generation device configured to generate image light, a first reflection section configured to reflect the image light emitted from the image light generation device, a first diffraction element including a first incident surface and configured to diffract and deflect the image light emitted from the first reflection section and entering through the first incident surface, a second reflection section configured to reflect the image light emitted from the first diffraction element, and a second diffraction element including a second incident surface and configured to diffract and deflect the image light emitted from the second reflection section and entering through the second incident surface, thereby forming an exit pupil. When viewed from a normal line direction of a virtual plane including a normal line of the first incident surface and a normal line of the second incident surface, a portion of a first reflection region, in the first reflection section, configured to reflect the image light emitted from the image light generation device and a portion of a second reflection region, in the second reflection section, configured to reflect the image light emitted from the first diffraction element overlap each other.

A display device according to one aspect of the present disclosure includes the display module according to an aspect of the present disclosure and a housing configured to accommodate the display module.

DESCRIPTION OF EXEMPLARY EMBODIMENTS

First Exemplary Embodiment

A first exemplary embodiment according to the present disclosure will be described below with reference to FIG. 1 to FIG. 4.

Figure 1:
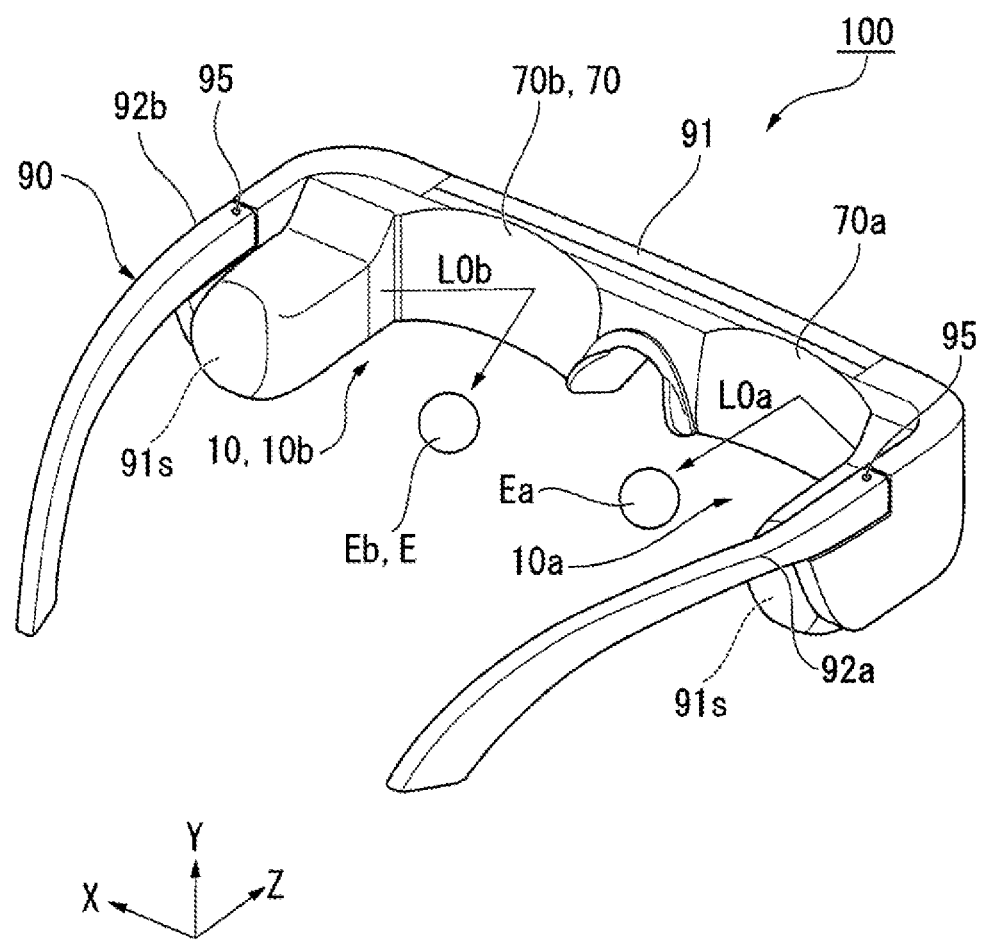
FIG. 1 is a perspective view of a display device according to a first exemplary embodiment.
Figure 2:
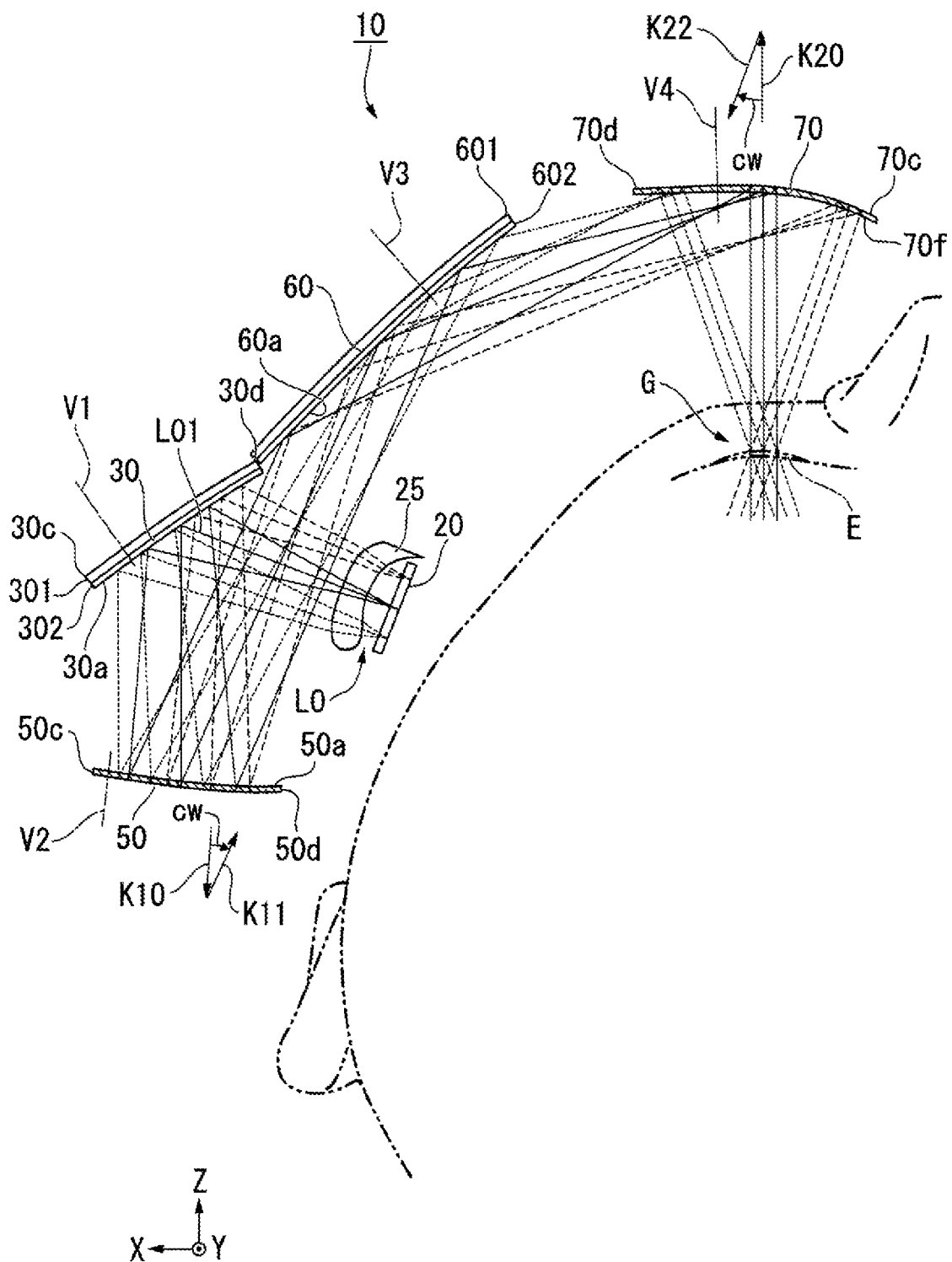
FIG. 2 is a plan view illustrating a configuration of a display module according to the first exemplary embodiment.

FIG. 1 is a perspective view illustrating a head-mounted display apparatus of this exemplary embodiment. FIG. 2 is a plan view illustrating a schematic configuration of a display module of the head-mounted display apparatus.

In the following description, the head-mounted display apparatus is simply referred to as a display device. Further, in the drawings, the dimensions of some components may be scaled differently for ease of understanding of the components.

In the drawings, based on a front-rear direction, a left-right direction, and an up-down direction when a display device 100 is mounted onto a head of an observer, the following directions are defined. An axis in the up-down direction is a Y-axis, a direction upward from below is a +Y direction, and a direction downward from above is a −Y direction. An axis in the front-rear direction is a Z-axis, a direction frontward from the rear is a +Z direction, and a direction rearward from the front is a −Z direction. An axis in the left-right direction is an X-axis, a direction leftward from the right is a +X direction, and a direction rightward from the left is a −X direction. The Y-axis, the Z-axis, and the X-axis are orthogonal to each other.

When the directions described above are defined using the components of the display device 100, an axis connecting a center of a second diffraction element 70a of a right-eye display module 10a and a center of a second diffraction element 70b of a left-eye display module 10b is the X-axis, a direction from the second diffraction element 70a toward the second diffraction element 70b is the +X direction, and a direction from the second diffraction element 70b toward the second diffraction element 70a is the −X direction. In a display module 10 described later, an optical axis of an exit pupil is the Z-axis, a direction from the exit pupil toward the second diffraction element 70a or the second diffraction element 70b is the +Z direction, and a direction from the second diffraction element 70a or the second diffraction element 70b toward the exit pupil is the −Z direction. An axis in a vertical direction of a display surface of an image light generation device 20 is the Y-axis, a direction upward from below the display surface is the +Y direction, and a direction downward from above the display surface is the −Y direction.

As illustrated in FIG. 1, the display device 100 includes the right-eye display module 10a configured to cause image light L0a to be incident on a right eye Ea, the left-eye display module 10b configured to cause image light L0b to be incident on a left eye Eb, and a housing 90 configured to accommodate the right-eye display module 10a and the left-eye display module 10b. The display device 100 has, for example, an eyeglasses-like shape. The display device 100 is mounted onto the head of the observer by the housing 90.

The housing 90 includes a frame 91, a temple 92a provided on the right side of the frame 91 and locked on a right ear of the observer, and a temple 92b provided on the left side of the frame 91 and locked on a left ear of the observer. The frame 91 includes storage spaces 91s on both side portions, and components such as the various optical elements that constitute the display module 10 described later are accommodated inside the storage spaces 91s. The temples 92a, 92b are foldably coupled to the frame 91 by hinges 95.

The right-eye display module 10a and the left-eye display module 10b differ in that the optical members are disposed symmetrically, but the basic configurations are the same. Accordingly, the right-eye display module 10a and the left-eye display module 10b will be described as the display module 10 without distinction in the description below.

As illustrated in FIG. 2, the display module 10 of this exemplary embodiment includes the image light generation device 20, a projection optical system 25, a first reflection section 30, a first diffraction element 50, a second reflection section 60, and a second diffraction element 70. The image light generation device 20 is configured to generate image light L0. The projection optical system 25 is configured to project the image light L0 generated by the image light generation device 20. The first reflection section 30 is configured to reflect the image light L0 emitted from the image light generation device 20. The first diffraction element 50 is configured to diffract and deflect the image light L0 emitted from the first reflection section 30. The second reflection section 60 is configured to reflect the image light L0 emitted from the first diffraction element 50. The second diffraction element 70 is configured to diffract and deflect the image light L0 emitted from the second reflection section 60 thereby forming an exit pupil G.

The image light generation device 20 is constituted by a display panel such as an organic electroluminescent display panel, for example. In a state in which the observer is wearing the display device 100, the image light generation device 20 is disposed somewhat laterally rearward of an eye E, and is configured to emit the image light L0 obliquely frontward of a side away from the face.

Note that the image light generation device 20 may include a plurality of display panels corresponding to different colors, and a synthesis optical system configured to synthesize image light of the respective colors emitted from the plurality of display panels. Further, the image light generation device 20 may include an illumination light source and a display panel such as a liquid crystal display element configured to modulate illumination light emitted from the illumination light source. Alternatively, the image light generation device 20 may have a configuration in which laser light is modulated using a micro-mirror device. Alternatively, the image light generation device 20 may be constituted by micro light-emitting diodes (LEDs), micro-electromechanical systems (MEMS) displays, and the like.

The projection optical system 25 is an optical system configured to project the image light L0 generated by the image light generation device 20, and is constituted by a projection lens. While FIG. 2 illustrates an example in which the projection optical system 25 is constituted by one projection lens, the projection optical system may be constituted by a plurality of projection lenses. Furthermore, a configuration in which the plurality of projection lenses are bonded together, for example, a bonded achromatic lens or the like, may be used. Further, the projection lens may be a non-spherical lens, such as a free curved lens, or may be a spherical lens.

The first reflection section 30 is constituted by a total reflection mirror. Specifically, the first reflection section 30 includes a base material 301 and a reflection layer 302 composed of a dielectric multilayer film, a metal film, or the like formed on one surface of the base material 301. The first reflection section 30 is disposed tilted so that an angle formed by a normal line V1 of a reflection surface 30a and the Z-axis is 45° or less, and an end portion 30c on a far side with respect to the exit pupil G is positioned in the −Z direction relative to an end portion 30d on a near side with respect to the exit pupil G. Thus, an optical axis L01 of the image light L0 and the normal line V1 of the reflection surface 30a form an angle of 45° or less. The reflection surface 30a is constituted by a curved surface, and thus the first reflection section 30 has positive power. The first reflection section 30 is configured to reflect the image light L0 emitted from the image light generation device 20 and deflect the image light L0 toward the first diffraction element 50.

Note that the optical axis L01 of the image light L0 is an axis through which a central main beam of the image light L0 emitted from a center of a display region of the image light generation device 20 passes. In other words, the optical axis L01 of the image light L0 is an axis parallel to a normal line of an image light emission surface of the image light generation device 20. Further, when the image light generation device 20 is constituted by a laser light source and a mirror configured to scan light from the laser light source, an image plane is formed by the scanning of the laser light, and therefore the optical axis of the image light L0 is an axis that passes through a center of the image plane and is parallel to a normal line of the image plane.

The first diffraction element 50 includes a reflection-type volume hologram. The first diffraction element 50 has a recessed curved surface in which the first incident surface 50a on which the image light L0 is incident is recessed. In other words, the first incident surface 50a has a shape in which a central portion is recessed and curved relative to a peripheral portion in the incident direction of the image light L0. Thus, the first diffraction element 50 includes positive power and can efficiently deflect the image light L0 toward the second reflection section 60. The first diffraction element 50 is disposed inclined so that an angle formed by a normal line V2 of the first incident surface 50a and the Z-axis is 450 or less and smaller than an angle formed by the normal line V1 of the reflection surface 30a of the first reflection section 30 and the Z-axis. Further, the first diffraction element 50 is disposed inclined so that an end portion 50c on a far side with respect to the exit pupil G is positioned in the +Z direction relative to an end portion 50d on a near side with respect to the exit pupil G. Thus, the optical axis L01 of the image light L0 and the normal line V2 of the first reflection surface 50a form an angle of 450 or less.

Note that the first diffraction element 50, as long as a reflection-type diffraction element, is not limited to a volume hologram, and may be, for example, a surface relief-type diffraction element, a surface relief holographic element, or the like. Regardless of the configuration, when the image light L0 is incident from a normal line direction of the first incident surface 50a, the first diffraction element 50 has a property of emitting diffraction light having the highest diffraction efficiency in one specific direction.

Figure 3:
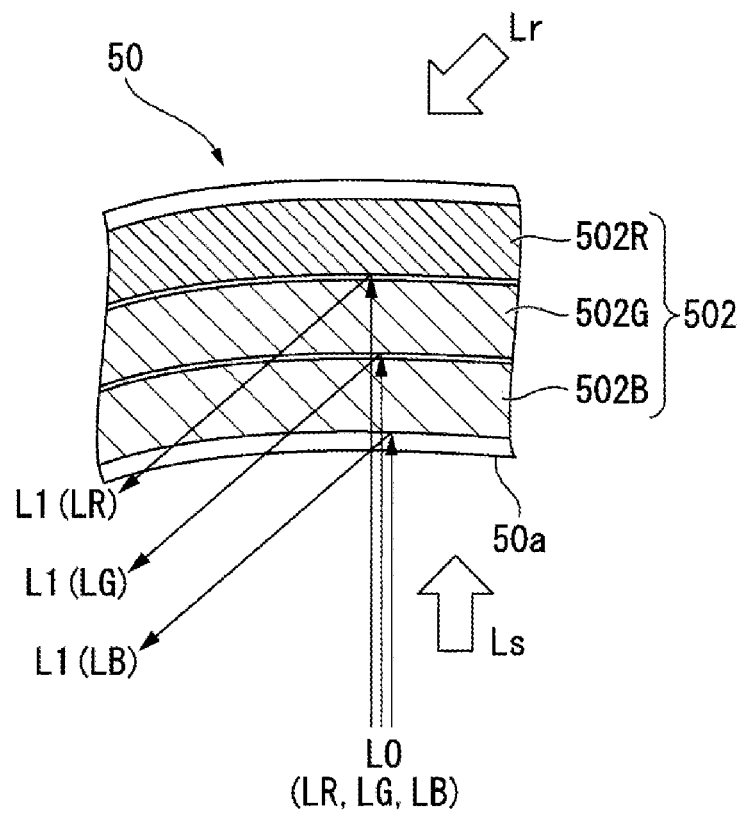
FIG. 3 is an explanatory view of interference fringes of a reflection-type volume hologram.

FIG. 3 is an explanatory view of interference fringes of a reflection-type volume hologram constituting the first diffraction element 50. As illustrated in FIG. 3, the reflection-type volume hologram constituting the first diffraction element 50 is provided with interference fringes 502 having a pitch corresponding to a specific wavelength. The interference fringes 502 are recorded as a difference in refractive index of hologram material in a hologram photosensitive layer. The interference fringes 502 are inclined in one direction relative to the first incident surface 50a of the first diffraction element 50 so as to correspond to a specific incident angle. Accordingly, the first diffraction element 50 diffracts and then deflects the image light L0 in a predetermined direction. The specific wavelength and the specific incident angle correspond to a wavelength and an incident angle of the image light L0. The interference fringes 502 can be formed by performing interference exposure on the holographic photosensitive layer by using reference light Lr and object light Ls.

In this exemplary embodiment, the image light L0 is light used for color display, including red light LR, green light LG, and blue light LB. Thus, in the first diffraction element 50, the interference fringes 502 are formed at a pitch corresponding to a specific wavelength. For example, interference fringes 502R for red light are formed at a pitch corresponding to a wavelength of 615 nm, for example, in a wavelength range from 580 nm to 700 nm of a red color gamut. Interference fringes 502G for green light are formed at a pitch corresponding to a wavelength of 535 nm, for example, in a wavelength range from 500 nm to 580 nm of a green color gamut. Interference fringes 502B for blue light are formed at a pitch corresponding to a wavelength of 460 nm, for example, in a wavelength range from 400 nm to 500 nm of a blue color gamut.

Note that, while the interference fringes 502 are drawn linearly in FIG. 3, when the image light L0 incident on the first diffraction element 50 is a spherical wave, the spherical wave is used as the object light Ls, for example, during interference exposure. In this case, the plurality of interference fringes 502 are each formed in a curved state in the hologram photosensitive layer. Accordingly, the interference fringes 502 are inclined, in a curved state, in one direction relative to the first incident surface 50a of the first diffraction element 50. Thus, when the image light L0 composed of a spherical wave having a single wavelength is incident from the normal line direction of the first incident surface 50a, the first diffraction element 50 emits diffraction light Li having the highest diffraction efficiency in a specific direction inclined from the normal line direction. When the interference fringes 502 are curved, an inclined direction of the interference fringes 502 is defined as an inclination of a straight line connecting both ends of the interference fringe 502, for example.

The second reflection section 60 is constituted by a total reflection mirror. Specifically, the second reflection section 60 includes a base material 601 and a reflection layer 602 composed of a dielectric multilayer film, a metal film, or the like formed on one surface of the base material 601. The second reflection section 60 is disposed inclined so that an angle formed by a normal line direction of the reflection surface 60a and the Z-axis is substantially 45°. Thus, the optical axis L01 of the image light L0 and a normal line V3 of the reflection surface 60a form an angle of 450 or greater. The reflection surface 60a is constituted by a curved surface, and thus the second reflection section 60 has positive power. The second reflection section 60 is configured to reflect the image light L0 emitted from the first diffraction element 50 and deflect the image light L0 toward the second diffraction element 70.

The second diffraction element 70 includes a reflection-type volume hologram. The second diffraction element 70 has a recessed curved surface in which the second incident surface 70f on which the image light L0 is incident is recessed. In other words, the second incident surface 71f has a shape in which a central portion is recessed and curved relative to a peripheral portion in the incident direction of the image light L0. Thus, the second diffraction element 70 includes positive power and can efficiently deflect the image light L0 toward the exit pupil G. The second diffraction element 70 is disposed inclined so that an angle formed by a normal line V4 of the second incident surface 70f and the Z-axis is 450 or less. Further, the second diffraction element 70 is disposed inclined so that an end portion 70c on a side close to the nose is positioned in the −Z direction relative to an end portion 70d on a side far from the nose. Thus, the optical axis L01 of the image light L0 and the normal line of the second incident surface 70f form an angle of 45° or greater.

A basic configuration of the reflection-type volume hologram constituting the second diffraction element 70 is the same as the basic configuration of the reflection-type volume hologram constituting the first diffraction element 50, and thus detailed description of the reflection-type volume hologram is omitted. However, the reflection-type volume hologram constituting the second diffraction element 70 is constituted by a partial reflection-type diffraction optical element configured to reflect a portion of incident light and transmit the other portion. Therefore, the second diffraction element 70 functions as a partially transmissive reflective combiner. Thus, outside light is incident on the eye E of the observer via the second diffraction element 70, and therefore the observer can visually recognize an image in which the image formed by the image light generation device 20 and the background are superimposed onto each other.

Note that the second diffraction element 70, as long as a reflection-type diffraction element, is not limited to a volume hologram, and may be, for example, a surface relief-type diffraction element, a surface relief holographic element, or the like, similar to the first diffraction element 50. Regardless of the configuration, when the image light L0 is incident from a normal line direction of the second incident surface 70f, the second diffraction element 70 has a property of emitting diffraction light having the highest diffraction efficiency in a specific direction.

Figure 4:
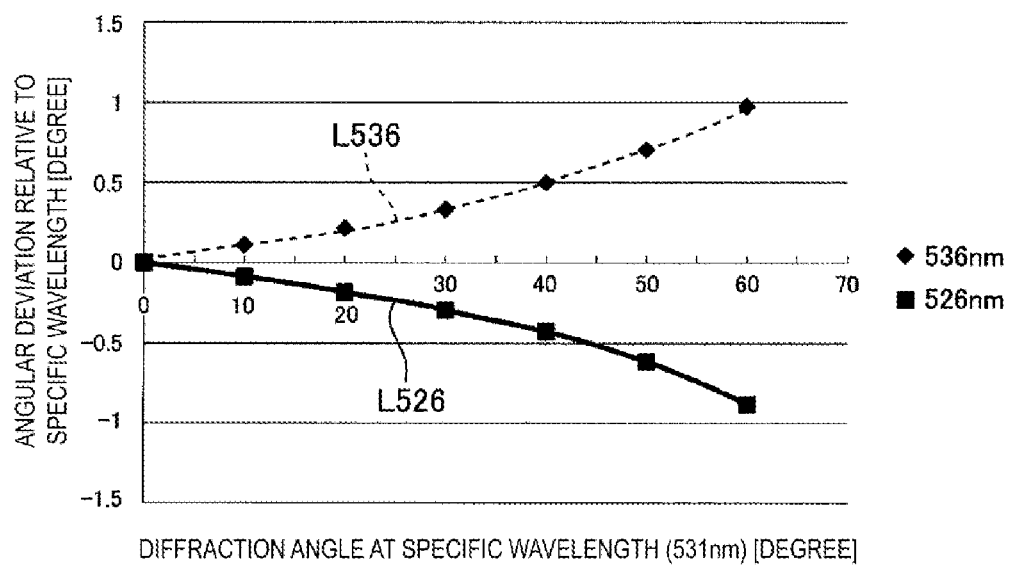
FIG. 4 is a diagram illustrating diffraction characteristics of a first diffraction element and a second diffraction element.

FIG. 4 is a diagram illustrating diffraction characteristics of the first diffraction element 50 and the second diffraction element 70.

FIG. 4 illustrates a difference in diffraction angle between a specific wavelength and a peripheral wavelength when a light beam is incident on one point on the reflection-type volume hologram. In FIG. 4, given 531 nm as the specific wavelength, a deviation in diffraction angle of light having a peripheral wavelength of 526 nm is indicated by a solid line L526, and a deviation in diffraction angle of light having a peripheral wavelength of 536 nm is indicated by a dashed line L536.

As illustrated in FIG. 4, even when light beams are incident on the same interference fringes recorded in the reflection-type volume hologram, a light beam having a longer wavelength is diffracted at a larger angle, and a light beam having a shorter wavelength is diffracted at a smaller angle. Therefore, when two diffraction elements composed of the first diffraction element 50 and the second diffraction element 70 are used, an incident angle of light having wavelengths longer than a specific wavelength and an incident angle of light having wavelengths shorter than the specific wavelength must be considered, otherwise aberration cannot be properly compensated. In addition, because the angle of diffraction varies depending on the number of interference fringes, the configuration of the interference fringes must be considered. In the display module 10 of this exemplary embodiment illustrated in FIG. 2, orientations of the first diffraction element 50 and the second diffraction element 70 relative to the image light L0 and the like are made appropriate in accordance with whether the sum of the number of times an intermediate image is formed and the number of times reflection occurs between the first diffraction element 50 and the second diffraction element 70 is an odd number or an even number.

Here, assume a virtual plane including a normal line V2 of the first incident surface 50a of the first diffraction element 70 and a normal line V4 of the second incident surface 70f of the second diffraction element 70. In the case of this exemplary embodiment, the virtual plane is the paper surface of FIG. 2, and is an XZ plane.

In this exemplary embodiment, the sum of the number of times the image light L0 is reflected and the number of times an intermediate image is generated between the first diffraction element 50 and the first diffraction element 70 is an even number. Therefore, when viewed from a normal line direction of the virtual plane, in the first diffraction element 50 and the second diffraction element 70, when light beams are incident from the normal line directions of the respective incident surfaces 50a, 70f, the directions in which the diffraction light is emitted at the highest diffraction efficiency are set to the same side with respect to the normal line directions of the respective incident surfaces 50a, 70f.

More specifically, in this exemplary embodiment, the second reflection section 60 is provided on the optical path of the image light L0 between the first diffraction element 50 and the second diffraction element 70, and therefore the image light L0 is reflected once between the first diffraction element 50 and the second diffraction element 70. Further, because the first diffraction element 50 and the second reflection section 60 each have positive power, one intermediate image is generated between the second reflection section 60 and the second diffraction element 70. Accordingly, the sum of the number of times the image light is reflected and the number of times an intermediate image is generated between the first diffraction element 50 and the first diffraction element 70 is two, that is, an even number.

Accordingly, given a direction in which the image light L0 is emitted at the highest diffraction efficiency when the image light L0 is incident from the normal line direction of the first incident surface 50a as a first direction, and a direction in which the image light L0 is emitted at the highest diffraction efficiency when the image light L0 is incident from the normal line direction of the second incident surface 70f as a second direction, the first direction relative to the normal line direction of the first incident surface 50a and the second direction relative to the normal line direction of the second incident surface 70f are configured to be positioned on the same side when viewed from the normal line direction of the virtual plane.

More specifically, as illustrated in FIG. 2, when light is incident from the normal line direction relative to the first incident surface 50a of the first diffraction element 50, a first direction K11 in which diffraction light having the highest diffraction efficiency is emitted is in a position rotated in a clockwise direction CW with respect to a normal line direction K10 of the first incident surface 50a. Further, when light is incident from the normal line direction relative to the second incident surface 70f of the second diffraction element 50, a second direction K22 in which diffraction light having the highest diffraction efficiency is emitted is in a position rotated in the clockwise direction CW with respect to a normal line direction K20 of the second incident surface 70f.

That is, the first direction K11 in which the diffraction light having the highest diffraction efficiency is emitted in the first diffraction element 50 and the second direction K22 in which the diffraction light having the highest diffraction efficiency is emitted in the second diffraction element 70 are positioned on the same side with respect to the normal line directions K10, K20 of the respective incident surfaces 50a, 70f. This configuration is realized by coordinating an inclination direction of the interference fringes of the first diffraction element 50 and an inclination direction of the interference fringes of the second diffraction element 70.

According to this configuration, given a case in which a light beam having an optimum wavelength is incident from the normal line direction K10 of the first incident surface 50a of the first diffraction element 50 as reference, the diffraction light when a light beam having a wavelength longer than the optimal wavelength is incident inclines in a direction rotated in the clockwise. Accordingly, when the diffraction light of a light beam having a wavelength longer than the optimal wavelength is incident on the second incident surface 70f of the second diffraction element 70 via the second reflection section 60, the light beam is incident from a direction rotated further clockwise than the light beam of the optimum wavelength. Therefore, light beams having an optimal wavelength and light beams having a wavelength longer than the optimal wavelength are emitted from the second diffraction element 70 in the same direction.

As a result, a reduction in resolution is less likely to occur. Therefore, according to this exemplary embodiment, wavelength compensation can be realized, and deviation of the image when the wavelength of the image light L0 varies can be suppressed small.

With regard to a positional relationship of the optical elements, when viewed from the observer, the first reflection section 30 is disposed at a position farther from the face than the image light generation device 20, the first diffraction element 50 is disposed at a position farther rearward, that is, closer to the ear, than the first reflection section 30, and the second reflection section 60 is disposed farther frontward, that is, farther from the ear, than the first diffraction element 50. Further, the image light generation device 20 is disposed at a position closer to the exit pupil G than the first diffraction element 50.

Due to the arrangement of these optical elements, the image light L0 emitted from the first reflection section 30 is incident on the first diffraction element 50 from the far side toward the near side with respect to the exit pupil G and the image light L0 emitted from the first diffraction element 50 is incident on the second reflection section 60 from the far side toward the near side with respect to the exit pupil G.

Accordingly, when viewed from the normal line direction of the virtual plane, an optical axis of the image light L0 traveling from the image light generation device 20 toward the first reflection section 30 and an optical axis of the image light L0 traveling from the first diffraction element 50 toward the second reflection section 60 intersect each other. Furthermore, when viewed from the normal line direction of the virtual plane, a portion of an optical path of the image light L0 emitted from the image light generation device 20 and incident on the first reflection section 30 and a portion of an optical path of the image light L0 emitted from the first diffraction element 50 and incident on the second reflection section 60 overlap each other.

In the display device of JP-A-2019-133132, the image light traveling from the image light generation device toward the first diffraction element and the image light traveling from the first diffraction element toward the mirror do not overlap each other. Therefore, the image light generation device must be disposed at a position away from the face of the observer, and the device may increase in size.

In contrast, according to the display module 10 of this exemplary embodiment, the optical axis of the image light L0 traveling from the image light generation device 20 toward the first reflection section 30 and the optical axis of the image light L0 traveling from the first diffraction element 50 toward the second reflection section 60 intersect each other. In other words, the optical path of the image light L0 from the image light generation device 20 to the second reflection section 60 is folded back by the first reflection section 30 and the first diffraction element 50. Thus, optical elements such as the image light generation device 20, the first reflection section 30, and the first diffraction element 50 can be disposed frontward of a temporal portion of the observer. In particular, a space surrounded by the frame 91, the temples 92a, 92b, and the face exists frontward of the temporal portion of the observer, and is suitable for arranging various optical elements. Therefore, according to the display module 10 of this exemplary embodiment, it is possible to effortlessly reduce the size of the optical system.

Further, the display device 100 of this exemplary embodiment is provided with the display module 10 having the advantageous effects described above, and therefore is compact in size and excellent in designability.

Second Exemplary Embodiment

A second exemplary embodiment according to the present disclosure will be described below with reference to FIG. 5.

A basic configuration of a display device according to the second exemplary embodiment is the same as that of the first exemplary embodiment except in the configuration of the first reflection section and the second reflection section. Therefore, description of the display device in its entirety is omitted.

Figure 5:
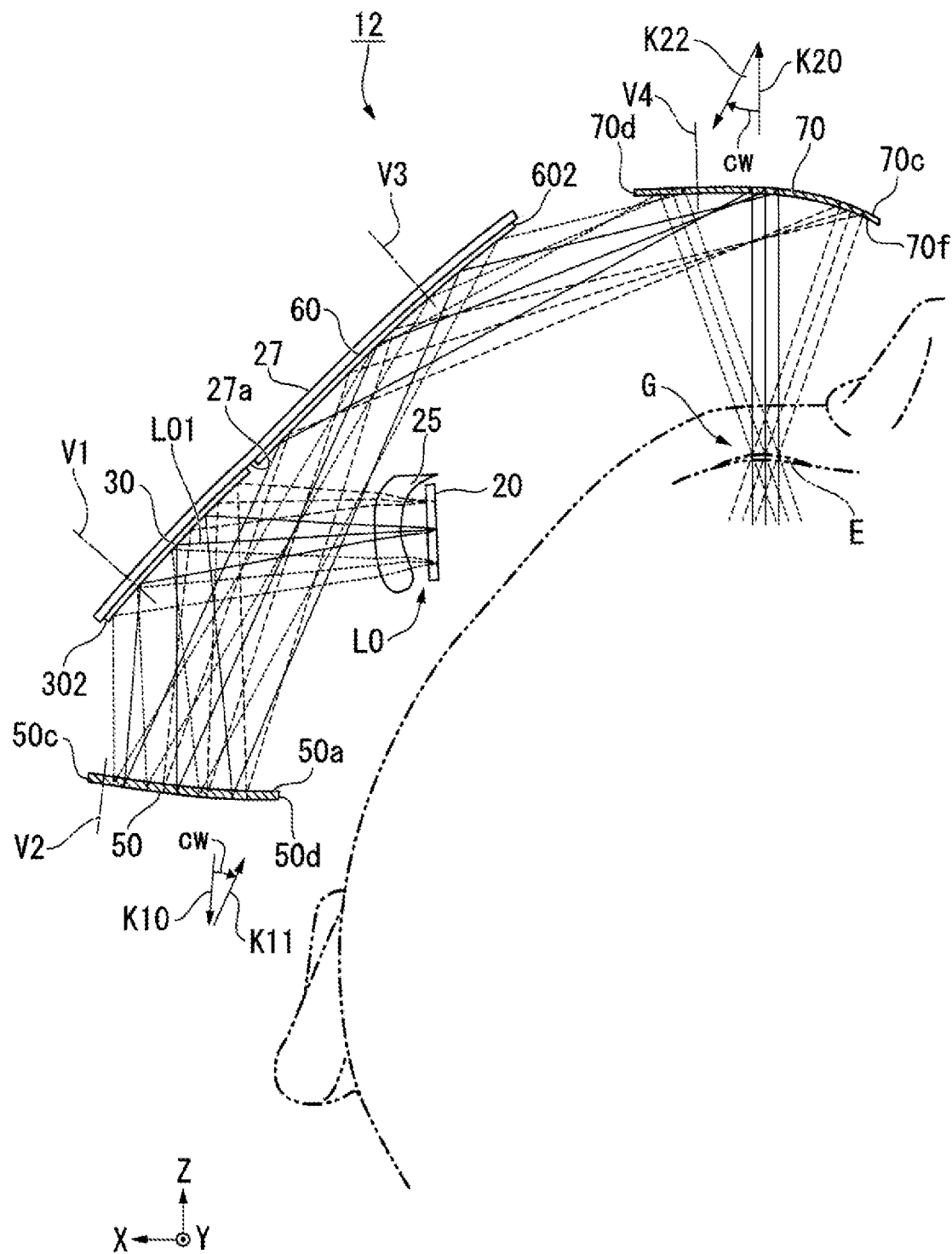
FIG. 5 is a plan view illustrating a configuration of a display module according to a second exemplary embodiment.

FIG. 5 is a plan view illustrating a schematic configuration of the display module of the second exemplary embodiment.

In FIG. 5, the components common to those in FIG. 2 based on the first exemplary embodiment are denoted using the same reference numerals, and descriptions thereof are omitted.

As illustrated in FIG. 5, a display module 12 of this exemplary embodiment includes the image light generation device 20, the projection optical system 25, the first reflection section 30, the first diffraction element 50, the second reflection section 60, the second diffraction element 70, and a base material 27.

The base material 27 is configured to support the first reflection section 30 and the second reflection section 60. Specifically, the base material 27 includes a smooth, continuous curved surface, and is constituted by a plate material such as plastic having optical transparency. The first reflection section 30 and the second reflection section 60 are provided to a first surface 27a on, of two surfaces of the base material 27, a side facing the face of the observer. The first reflection section 30 and the second reflection section 60 may be formed directly on the first surface 27a of the base material 27, or the configuration may be one in which the first reflection section 30 and second reflection section 60, separately manufactured, are adhered to the first surface 27a of the base material 27.

Compared to FIG. 2 of the first exemplary embodiment, an installation angle of the second reflection section 60 of this exemplary embodiment is the same as an installation angle of the second reflection section 60 of the first exemplary embodiment. Accordingly, in this exemplary embodiment, the first reflection section 30 and the second reflection section 60 are supported by the base material 27, which is common to each, thereby making the installation angle of the first reflection section 30 differ from the installation angle of the first reflection section 30 in the first exemplary embodiment in accordance with the installation angle of the second reflection section 60. Specifically, the angle formed by the normal line V1 of the reflection surface 30a of the first reflection section 30 and the Z-axis is greater than an angle formed by the normal line V1 of the reflection surface 30a of the first reflection section 30 and the Z-axis in the first exemplary embodiment.

Furthermore, in association with the change in the installation angle of the first reflection section 30, the positions of the image light generation device 20 and the projection optical system 25 differ from the positions of the image light generation device 20 and the projection optical system 25 in the first exemplary embodiment. Specifically, the image light generation device 20 and the projection optical system 25 are moved farther to the front side of the face of the observer than the image light generation device 20 and the projection optical system 25 in the first exemplary embodiment.

Other than this, the configuration of the display module 12 is the same as that of the first exemplary embodiment.

In this exemplary embodiment as well, the same advantageous effects as those in the first exemplary embodiment can be achieved, i.e., it is possible to provide a display module and a display device compact in size.

Further, in the display module 12 of this exemplary embodiment, because the first reflection section 30 and the second reflection section 60 are supported by the base material 27, which is common to each, the number of parts can be reduced. Further, because an outer shape of the display module 12 in the portion where the first reflection section 30 and the second reflection section 60 are disposed is a smooth, curved surface, a sleek appearance can be realized.

Further, in the display module 12 of this exemplary embodiment, the image light generation device 20 and the projection optical system 25 are moved farther to the front side of the face of the observer, specifically, to the front side near the temples of the observer, than the image light generation device 20 and the projection optical system 25 in the first exemplary embodiment. Thus, because the positions of the image light generation device 20 and the projection optical system 25 are away from the face of the observer, the image light generation device 20 and the projection optical system 25 are less likely to interfere with the face of the observer, making it easier to design the optical system.

Third Exemplary Embodiment

A third exemplary embodiment according to the present disclosure will be described below with reference to FIG. 6. A basic configuration of a display device according to the third exemplary embodiment is the same as that of the first exemplary embodiment except in the configuration of the first reflection section and the second reflection section. Therefore, description of the display device in its entirety is omitted.

Figure 6:
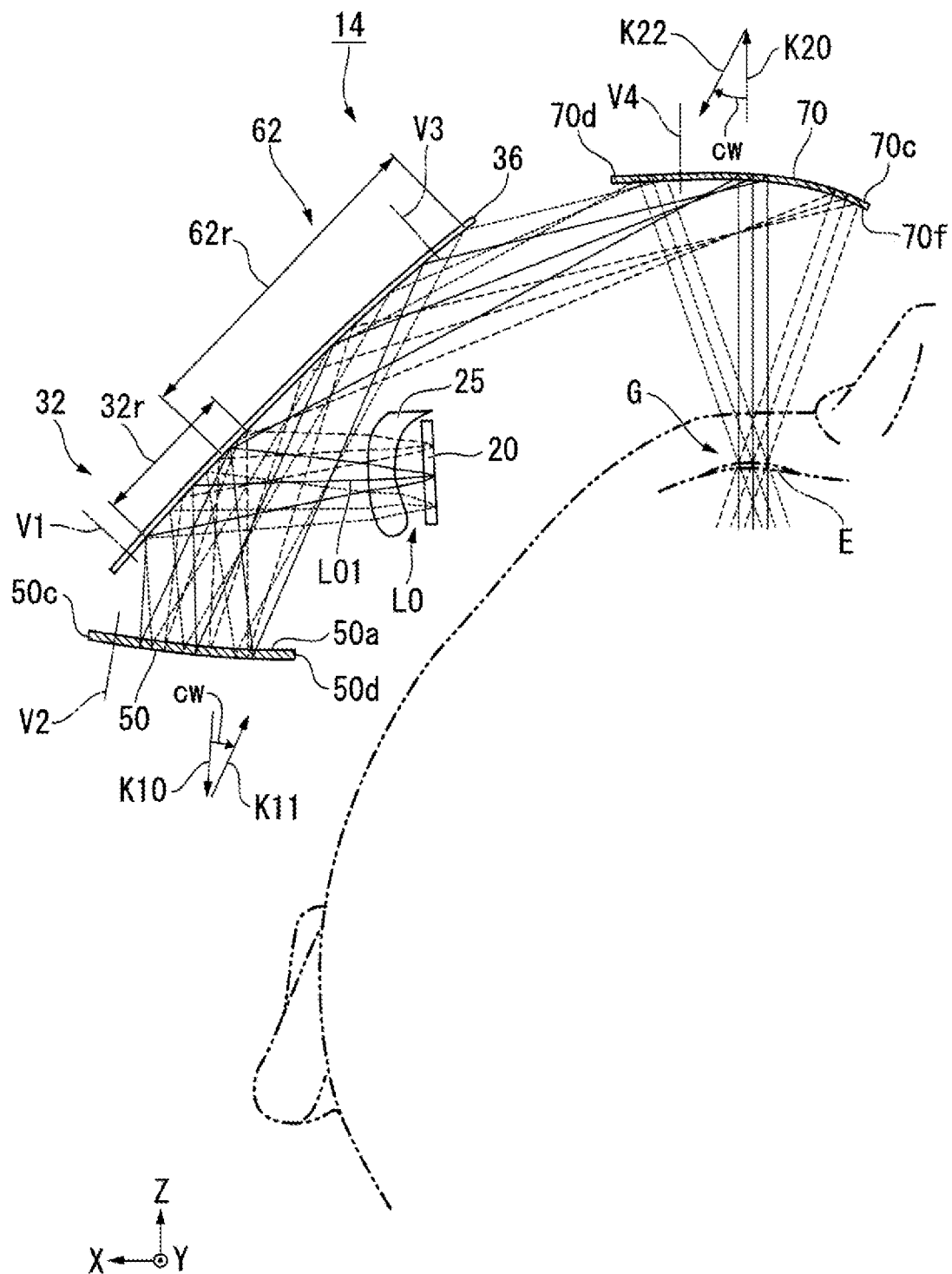
FIG. 6 is a plan view illustrating a configuration of a display module according to a third exemplary embodiment.

FIG. 6 is a plan view illustrating a schematic configuration of a display module according to the third exemplary embodiment.

In FIG. 6, the components common to those in FIG. 2 based on the first exemplary embodiment are denoted using the same reference numerals, and descriptions thereof are omitted.

As illustrated in FIG. 6, a display module 14 of this exemplary embodiment includes the image light generation device 20, the projection optical system 25, a first reflection section 32, the first diffraction element 50, a second reflection section 62, and the second diffraction element 70.

In the display module 14 of this exemplary embodiment, the first reflection section 32 and the second reflection section 62 are constituted by a reflection member 36 that is integrated and has a smooth, continuous curved surface. Here, of the reflection sections 32, 62, regions on which the image light L0 is actually incident and contributes to the reflection of the image light L0 are defined as reflection regions 32r, 62r. A portion of the first reflection region 32r configured to reflect the image light L0 emitted from the image light generation device 20 in the first reflection section 32 and a portion of the second reflection region 62r configured to reflect the image light L0 emitted from the first diffraction element 50 in the second reflection section 62 overlap each other. In other words, the first reflection region 32r and the second reflection region 62r share the same portion of the reflection member 36.

Other than this, the configuration of the display module 14 is the same as that of the first exemplary embodiment.

In this exemplary embodiment as well, the same advantageous effects as those in the first exemplary embodiment can be achieved, i.e., it is possible to provide a display module and a display device compact in size.

Further, in the display module 14 of this exemplary embodiment, because the first reflection section 30 and the second reflection section 60 are constituted by the integrated reflection member 36, the number of parts can be reduced. Further, because the outer shape of the reflection member 36 constituting the first reflection section 32 and the second reflection section 62 is a smooth, curved surface, the display module 14 having a sleek appearance can be realized.

Further, because the first reflection region 32r and the second reflection region 62r overlap, a length of the combined portion of the first reflection section 32 and second reflection section 62 can be shortened, and the position of the first diffraction element 50 can be moved farther frontward than the display module 10 of the first exemplary embodiment, making it possible to shorten the interval between the first reflection section 32 and the first diffraction element 50. This makes it possible to reduce a dimension of the display module 14 in the Z-axis direction.

Fourth Exemplary Embodiment

A fourth exemplary embodiment according to the present disclosure will be described below with reference to FIG. 7.

A basic configuration of a display device according to the fourth exemplary embodiment is the same as that of the first exemplary embodiment except in the configuration of the first reflection section, the second reflection section, and the second diffraction element. Therefore, description of the display device in its entirety is omitted.

Figure 7:
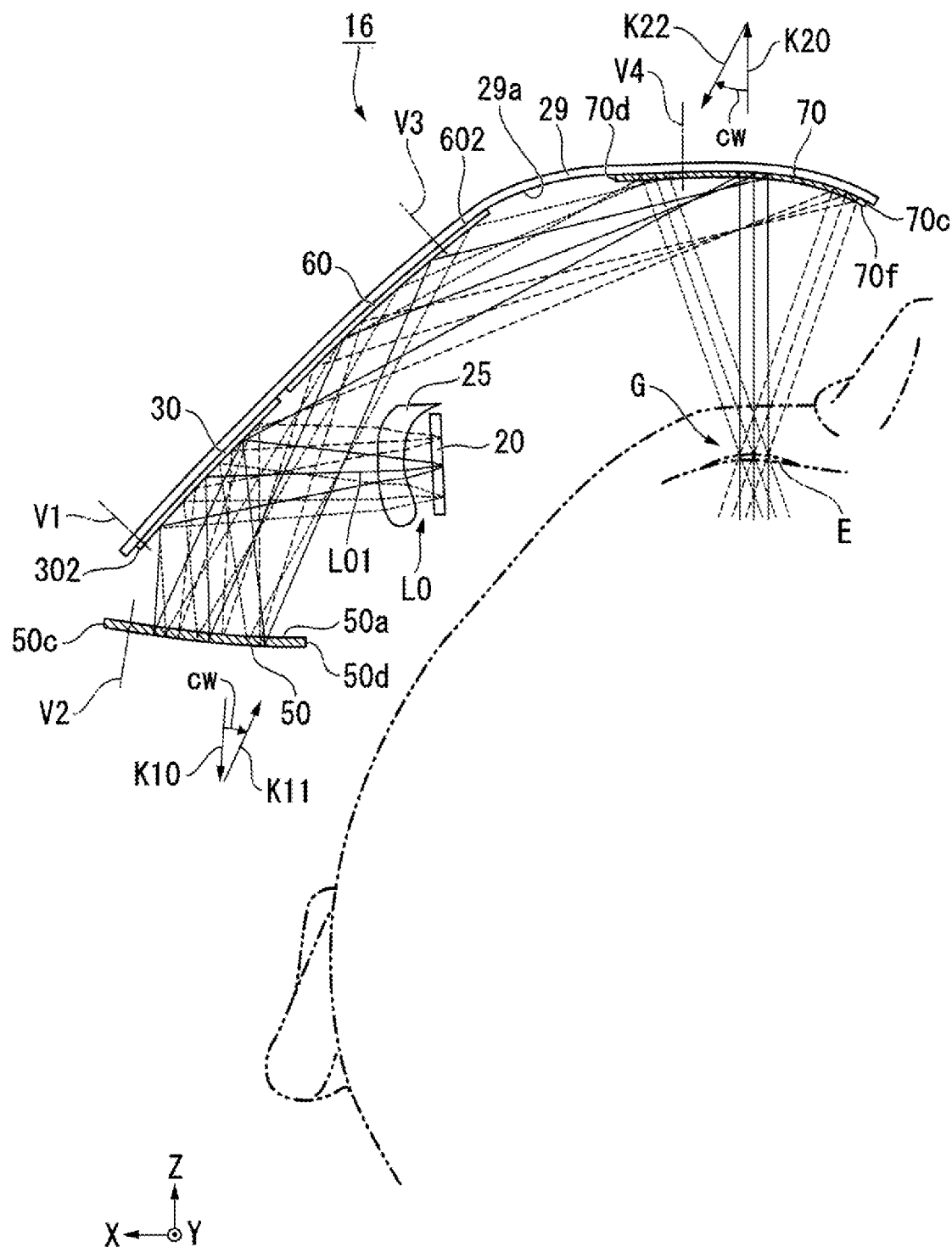
FIG. 7 is a plan view illustrating a configuration of a display module according to a fourth exemplary embodiment.

FIG. 7 is a plan view illustrating a schematic configuration of a display module 16 according to the fourth exemplary embodiment.

In FIG. 7, the components common to those in FIG. 2 based on the first exemplary embodiment are denoted using the same reference numerals, and descriptions thereof are omitted.

As illustrated in FIG. 7, the display module 16 of this exemplary embodiment includes the image light generation device 20, the projection optical system 25, the first reflection section 30, the first diffraction element 50, the second reflection section 60, the second diffraction element 70, and a base material 29.

The base material 29 is configured to support the first reflection section 30, the second reflection section 60, and the second diffraction element 70. Specifically, the base material 29 includes a smooth, continuous curved surface, and is constituted by a plate material such as plastic having optical transparency. The first reflection section 30, the second reflection section 60, and the second diffraction element 70 are provided to a first surface 29a of the base material 29. The first reflection section 30 and the second reflection section 60 are constituted by, for example, a metal mirror, a dielectric mirror, or a dichroic mirror formed by vapor deposition on a first surface of the plastic plate. The second diffraction element 70 has a configuration in which a volume hologram obtained by forming a hologram material on a protective plate composed of transparent plastic is bonded to the first surface of the plastic plate. That is, the second diffraction element 70 is provided to the first surface 29a of the base material 29.

Other than this, the configuration of the display module 16 is the same as that of the first exemplary embodiment.

In this exemplary embodiment as well, the same advantageous effects as those in the first exemplary embodiment can be achieved, i.e., it is possible to provide a display module and a display device compact in size.

Further, in the display module 16 of this exemplary embodiment, because the first reflection section 30, the second reflection section 60, and the second diffraction element 70 are supported by the base material 29, which is common to each, the number of parts can be reduced. Further, because an outer shape of the display module 16 in the portion where the first reflection section 30, the second reflection section 60, and the second diffraction element 70 are disposed is a smooth, curved surface, an appearance even sleeker than that of the second exemplary embodiment can be realized.

Note that the technical scope of the present disclosure is not limited to the above-described exemplary embodiments, and various modifications can be made to the above-described exemplary embodiments without departing from the spirit and gist of the present disclosure.

For example, while the above-described exemplary embodiments illustrate examples in which optical elements, such as the first reflection section, the second reflection section, and the second diffraction element, are disposed on the first surface of the base material, these optical elements may be disposed on either of the two surfaces of the base material.

Further, while the above-described exemplary embodiments illustrate a configuration in which the sum of the number of times the image light is reflected and the number of times an intermediate image is generated between the first diffraction element and the second diffraction element is an even number, the sum of the number of times the image light is reflected and the number times an intermediate image is generated between the first diffraction element and the second diffraction element may be an odd number. For example, a third reflection section may be provided between the second reflection section and the second diffraction element, and the sum described above may be three times. In this case, when viewed from the normal line direction of the virtual plane, the first direction relative to the normal line direction of the first incident surface and the second direction relative to the normal line direction of the second incident surface may be positioned on different sides. Accordingly, for example, one of the first direction relative to the normal line direction of the first incident surface and the second direction relative to the normal line direction of the second incident surface may be positioned in the clockwise direction and the other may be positioned in the counterclockwise direction.

Specifically, while the above-described exemplary embodiments illustrate an example in which the sum of the number of times the image light is reflected and the number of times an intermediate image is generated between the first diffraction element and the second diffraction element is two or three times, the number may be an even number other than two. Further, the sum described above may be zero times, and zero times is included in even numbers. Furthermore, the sum described above may be an odd number other than three.

Furthermore, the specific descriptions of shape, number, arrangement, material, and the like of each component of the display module and the display device are not limited to those of the above-described exemplary embodiments, and can be changed as appropriate.

A display module according to one aspect of the present disclosure may have the following configurations.

(1) In the display module according to one aspect of the present disclosure, when viewed from a position of the exit pupil, the image light generation device may be disposed at a position closer to the exit pupil than the first diffraction element.

(2) In the display module according to one aspect of the present disclosure, the image light emitted from the first reflection section may be incident on the first diffraction element from a far side toward a near side with respect to the exit pupil and the image light emitted from the first diffraction element may be incident on the second reflection section from a far side toward a near side with respect to the exit pupil.

(3) The display module according to one aspect of the present disclosure may further include a base material configured to support the first reflection section and the second reflection section, and the first reflection section and the second reflection section may be provided to a first surface of the base material.

(4) In the display module according to one aspect of the present disclosure, the second diffraction element may be provided to the first surface of the base material.

(5) In the display module according to one aspect of the present disclosure, when viewed from a direction orthogonal to the virtual plane, a portion of an optical path of the image light emitted from the image light generation device and incident on the first reflection section and a portion of an optical path of the image light emitted from the first diffraction element and incident on the second reflection section may overlap each other.

(6) In the display module according to one aspect of the present disclosure, the first diffraction element may be configured to diffract the image light at a diffraction efficiency highest in a first direction when the image light is incident from a normal line direction of the first incident surface, the second diffraction element may be configured to diffract the image light at a diffraction efficiency highest in a second direction when the image light is incident from a normal line direction of the second incident surface, and the first diffraction element and the second diffraction element may be disposed so that, when a sum of a number of times the image light is reflected and a number of times an intermediate image is generated between the first diffraction element and the second diffraction element is an even number, an orientation of the first direction relative to the normal line direction of the first incident surface and an orientation of the second direction relative to the normal line direction of the second incident surface are in a same direction when viewed from the normal line direction of the virtual plane and, when the sum is an odd number, the orientation of the first direction relative to the normal line direction of the first incident surface and the orientation of the second direction relative to the normal line direction of the second incident surface are in different directions when viewed from the normal line direction of the virtual plane.

What is claimed is:
1. A display module comprising:
an image light generation device configured to generate image light;
a first reflection section configured to reflect the image light emitted from the image light generation device;

a first diffraction element including a first incident surface and configured to diffract and deflect the image light emitted from the first reflection section and entering through the first incident surface;

a second reflection section configured to reflect the image light emitted from the first diffraction element; and a second diffraction element including a second incident surface and configured to diffract and deflect the image light emitted from the second reflection section and entering through the second incident surface, thereby forming an exit pupil, wherein when viewed from a normal line direction of a virtual plane including a normal line of the first incident surface and a normal line of the second incident surface, an optical axis of the image light traveling from the image light generation device toward the first reflection section and an optical axis of the image light traveling from the first diffraction element toward the second reflection section intersect each other.

2. A display module comprising:

an image light generation device configured to generate image light;

a first reflection section configured to reflect the image light emitted from the image light generation device;

a first diffraction element including a first incident surface and configured to diffract and deflect the image light emitted from the first reflection section and entering through the first incident surface;

a second reflection section configured to reflect the image light emitted from the first diffraction element; and a second diffraction element including a second incident surface and configured to diffract and deflect the image light emitted from the second reflection section and entering through the second incident surface, thereby forming an exit pupil, wherein when viewed from a normal line direction of a virtual plane including a normal line of the first incident surface and a normal line of the second incident surface, a portion of a first reflection region, in the first reflection section, configured to reflect the image light emitted from the image light generation device and a portion of a second reflection region, in the second reflection section, configured to reflect the image light emitted from the first diffraction element overlap each other.

3. The display module according to claim 1, wherein when viewed from a position of the exit pupil, the image light generation device is disposed at a position closer to the exit pupil than the first diffraction element is.

4. The display module according to claim 1, wherein the image light emitted from the first reflection section is incident on the first diffraction element from a far side toward a near side with respect to the exit pupil and the image light emitted from the first diffraction element is incident on the second reflection section from a far side toward a near side with respect to the exit pupil.

5. The display module according to claim 1, further comprising:

a base material configured to support the first reflection section and the second reflection section, wherein the first reflection section and the second reflection section are provided at a first surface of the base material.

6. The display module according to claim 5, wherein the second diffraction element is provided at the first surface of the base material.

7. The display module according to claim 1, wherein when viewed from a direction orthogonal to the virtual plane, a portion of an optical path of the image light emitted from the image light generation device and incident on the first reflection section and a portion of an optical path of the image light emitted from the first diffraction element and incident on the second reflection section overlap each other.

8. The display module according to claim 1, wherein the first diffraction element is configured to diffract the image light at a diffraction efficiency highest in a first direction when the image light is incident from a normal line direction of the first incident surface, the second diffraction element is configured to diffract the image light at a diffraction efficiency highest in a second direction when the image light is incident from a normal line direction of the second incident surface, and the first diffraction element and the second diffraction element are disposed so that when a sum of a number of times the image light is reflected and a number of times an intermediate image is generated between the first diffraction element and the second diffraction element is an even number, an orientation of the first direction relative to the normal line direction of the first incident surface and an orientation of the second direction relative to the normal line direction of the second incident surface are in a same direction when viewed from the normal line direction of the virtual plane and when the sum is an odd number, the orientation of the first direction relative to the normal line direction of the first incident surface and the orientation of the second direction relative to the normal line direction of the second incident surface are in different directions when viewed from the normal line direction of the virtual plane.

9. A display device comprising:

the display module according to claim 1 and a housing configured to accommodate the display module.

* * * * *